(12) United States Patent
Choe et al.

(10) Patent No.: US 10,699,849 B2
(45) Date of Patent: *Jun. 30, 2020

(54) MULTILAYER CERAMIC CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventors: Yeong Ju Choe, Suwon-si (KR); Min Woo Kim, Suwon-si (KR); Eun Jung Lee, Suwon-si (KR); Ki Pyo Hong, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,576

(22) Filed: Oct. 23, 2018

(65) Prior Publication Data
US 2020/0058446 A1    Feb. 20, 2020

(30) Foreign Application Priority Data
Aug. 14, 2018  (KR) .................. 10-2018-0094924

(51) Int. Cl.
*H01G 4/30*  (2006.01)
*H01G 4/12*  (2006.01)
(Continued)

(52) U.S. Cl.
CPC .............. *H01G 4/30* (2013.01); *H01G 4/005* (2013.01); *H01G 4/1227* (2013.01); *H01G 4/232* (2013.01)

(58) Field of Classification Search
CPC ........ H01G 4/30; H01G 4/1227; H01G 4/232; H01G 4/005
See application file for complete search history.

(56) References Cited

U.S. PATENT DOCUMENTS

| 8,542,476 B2 * | 9/2013 | Kim ...................... H01G 4/005 361/303 |
| 8,804,305 B2 * | 8/2014 | Kim ...................... H01G 4/232 361/311 |

(Continued)

FOREIGN PATENT DOCUMENTS

| JP | 2004-047536 A | 2/2004 |
| JP | 2012-094819 A | 5/2012 |

(Continued)

OTHER PUBLICATIONS

Choe et al., Multilayer Ceramic Capacitor and Method of Manufacturing the Same, Unpublished U.S. Appl. No. 16/274,753, filed Feb. 13, 2019 (Year: 2019).*

*Primary Examiner* — Nathan Milakovich
(74) *Attorney, Agent, or Firm* — Morgan, Lewis & Bockius LLP

(57) ABSTRACT

A multilayer ceramic capacitor includes a ceramic body including an active portion that includes a dielectric layer and a plurality of internal electrodes overlapping each other across the dielectric layer, and cover portions formed above and below the active portion, and including first and second surfaces opposing each other, third and fourth surfaces connecting the first and second surfaces, and fifth and sixth surfaces connected to the first to fourth surfaces and opposing each other, and first and second side margin portions disposed on the first and second surfaces. In a cross-section of the ceramic body in a length-thickness (L-T) direction, a ratio Sd/Sc of an area Sd of a region except for the active portion to an overall area Sc of the cross-section is greater than 27%.

15 Claims, 12 Drawing Sheets

(51) Int. Cl.
    *H01G 4/005*     (2006.01)
    *H01G 4/232*     (2006.01)

(56) References Cited

U.S. PATENT DOCUMENTS

| | | | |
|---|---|---|---|
| 9,042,081 B2 * | 5/2015 | Kim | H01G 4/30 361/301.2 |
| 2012/0073129 A1 | 3/2012 | Abe et al. | |
| 2012/0320496 A1 * | 12/2012 | Shin | H01G 4/30 361/321.2 |
| 2012/0327556 A1 | 12/2012 | Ahn et al. | |
| 2013/0141837 A1 * | 6/2013 | Lee | H01G 4/012 361/321.2 |
| 2014/0151102 A1 * | 6/2014 | Lee | H01G 2/065 174/260 |
| 2014/0368967 A1 * | 12/2014 | Ahn | H01G 4/30 361/301.4 |
| 2016/0240317 A1 * | 8/2016 | Ro | H01G 4/30 |

FOREIGN PATENT DOCUMENTS

| | | |
|---|---|---|
| KR | 10-2010-0136917 A | 12/2010 |
| KR | 10-2013-0006798 A | 1/2013 |
| KR | 10-2013-0063234 A | 6/2013 |

* cited by examiner

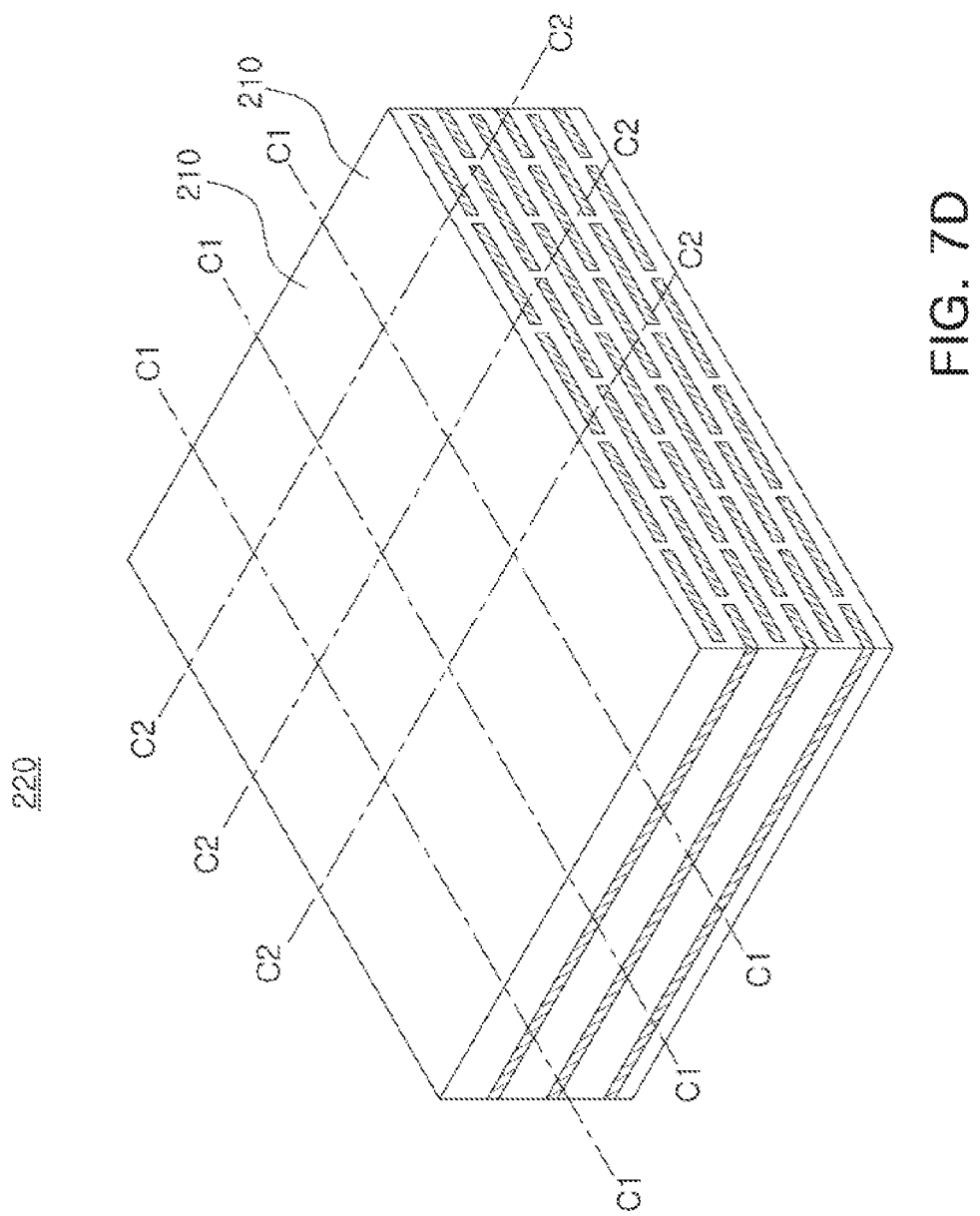

MULTILAYER CERAMIC CAPACITOR AND METHOD OF MANUFACTURING THE SAME

CROSS-REFERENCE TO RELATED APPLICATION(S)

This application claims the benefit of priority to Korean Patent Application No. 10-2018-0094924 filed on Aug. 14, 2018 in the Korean Intellectual Property Office, the disclosure of which is incorporated herein by reference in its entirety.

BACKGROUND

1. Field

The present disclosure relates to a multilayer ceramic capacitor and a method of manufacturing the same, where an adhesive force at an interface between a ceramic body and a side margin portion may be enhanced to improve reliability.

2. Description of Related Art

In general, an electronic component using a ceramic material, for example, a capacitor, an inductor, a piezoelectric element, a varistor, or a thermistor, includes a ceramic body formed of a ceramic material, an internal electrode formed in the body, and an external electrode installed on a surface of the ceramic body to be connected to the internal electrode.

In accordance with the recent trend toward miniaturized and multifunctional electronic products, a chip component has also been miniaturized and multifunctionalized and, thus, there also has been a need for high-capacity products with a small size and high capacity as a multilayer ceramic capacitor.

To achieve miniaturization and high capacity in a multilayer ceramic capacitor, an electrode effective area needs to be maximized (an effective volume fraction required to embody capacity needs to be increased).

As described above, to embody a miniaturized and high-capacity multilayer ceramic capacitor, a method of exposing the internal electrode in a width direction of the body to maximize an area of the internal electrode in the width direction through a marginless design and separately attaching a side margin portion to the exposed surface of the electrode in the width direction, prior to sintering, after such a chip is manufactured to complete a multilayer ceramic capacitor has been applied when the multilayer ceramic capacitor is manufactured.

However, when a lateral-surface ceramic green sheet is attached to a lateral surface of the ceramic body via thermocompression bonding in the above method, the side margin portion may not be completely adhered to the lateral surface of the ceramic body due to degraded adhesive force between the side margin portion and the ceramic body, and instead, the side margin portion may be partially delaminated from the ceramic body.

The side margin portion may be partially delaminated from the ceramic body, deteriorating the external appearance, degrading insulation resistance characteristics, and also decreasing waterproof reliability.

In particular, when a thermocompression bonding procedure is excessively performed to enhance adhesive force of an interface between the ceramic body and the side margin portion in a miniaturized and high-capacity product, there may be a problem in that a thin dielectric layer and internal electrode may be damaged to further enhance the probability of degrading electrical characteristics and causing failure.

Accordingly, there has been a need for research to enhance adhesive force of an interface between a ceramic body and a side margin portion in a miniaturized, high-capacity product.

SUMMARY

An aspect of the present disclosure may provide a multilayer ceramic capacitor and a method of manufacturing the same, where an adhesive force of an interface between a ceramic body and a side margin portion is enhanced by adjusting a shape of an internal electrode to improve reliability.

According to an aspect of the present disclosure, a multilayer ceramic capacitor may include a ceramic body including an active portion that includes a dielectric layer and a plurality of internal electrodes overlapping each other across the dielectric layer, and cover portions formed above and below the active portion, and including first and second surfaces opposing each other, third and fourth surfaces connecting the first and second surfaces, and fifth and sixth surfaces connected to the first to fourth surfaces and opposing each other, and first and second side margin portions disposed on the first and second surfaces, wherein the plurality of internal electrodes include body portions, and lead portions that have a smaller width than the body portions and have an end portion exposed through the third or fourth surface. The body portion of the plurality of internal electrodes is exposed through the first and second surfaces of the ceramic body and the first and second side margin portions are disposed on the body portion exposed through the first and second surfaces and, in a section of the ceramic body in a length-thickness (L-T) direction, a ratio Sd/Sc of an area Sd of a region except for the active portion to an overall area Sc of the section is greater than 27%.

According to another aspect of the present disclosure, a method of manufacturing a multilayer ceramic capacitor may include preparing a first ceramic green sheet on which a plurality of first internal electrode patterns are formed at a predetermined interval and a second ceramic green sheet on which a plurality of second internal electrode patterns are formed at a predetermined interval, forming a ceramic green sheet stack body by stacking the first and second ceramic green sheets in such a manner that the first and second internal electrode patterns intersect each other, cutting the ceramic green sheet stack body to have a lateral surface through which an end of the first and second internal electrode patterns is exposed in a width direction, forming first and second side margin portions on the lateral surface through which the end of the first and second internal electrode patterns is exposed, and preparing a ceramic body including an active portion that includes a dielectric layer and a plurality of internal electrodes disposed to face each other across the dielectric layer to form capacity and forms capacity, and cover portions formed above and below the active portion by sintering the cut stack body, and including first and second surfaces opposing each other, third and fourth surfaces connecting the first and second surfaces, and fifth and sixth surfaces connected to the first to fourth surfaces and opposing each other, wherein the plurality of internal electrodes include body portions that facilitate formation of capacity, and lead portions that have a smaller width than the body portions and have an one end portion exposed through the third or fourth surface, wherein the body portion of the plurality of internal electrodes are exposed through the first and second surfaces of the ceramic body and the first and second side margin portions are disposed on the body portion exposed through the first and second surfaces, and wherein, in a section of the ceramic body in a length-thickness (L-T) direction, a ratio Sd/Sc of an area Sd of a region except for the active portion to an overall area Sc of the section is greater than 27%.

BRIEF DESCRIPTION OF DRAWINGS

The above and other aspects, features, and advantages of the present disclosure will be more clearly understood from the following detailed description taken in conjunction with the accompanying drawings, in which:

FIGS. 7A to 7F are schematic cross-sectional views of a method of manufacturing a multilayer ceramic capacitor according to another exemplary embodiment of the present disclosure.

DETAILED DESCRIPTION

Hereinafter, exemplary embodiments of the present disclosure will now be described in detail with reference to the accompanying drawings.

Figure 1:
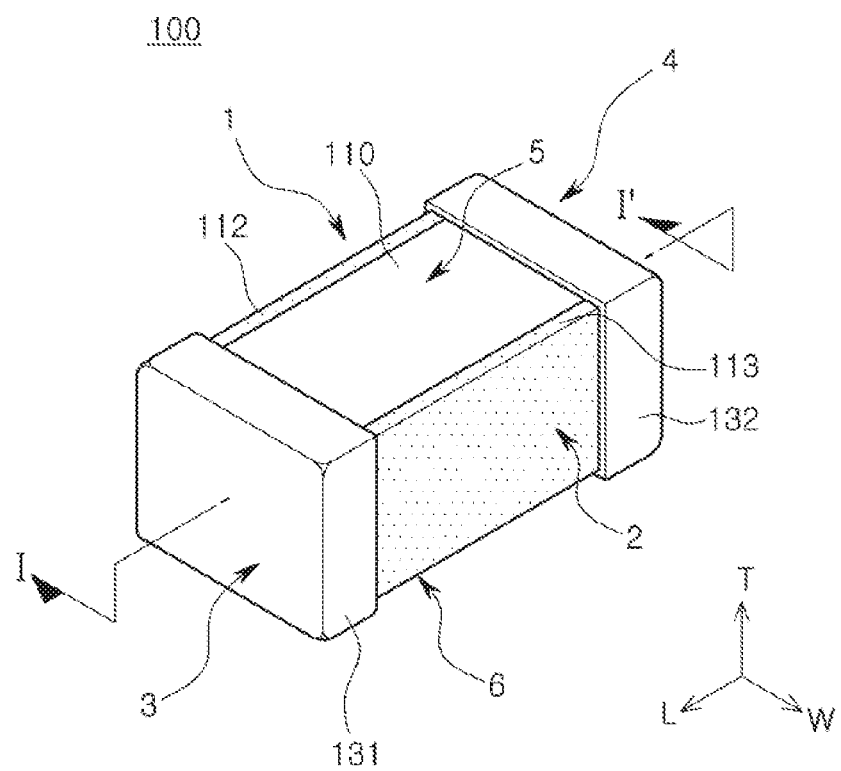
FIG. 1 is a schematic perspective view of a multilayer ceramic capacitor according to an exemplary embodiment of the present disclosure.

FIG. 1 is a schematic perspective view of a multilayer ceramic capacitor according to an exemplary embodiment of the present disclosure.

Figure 2:
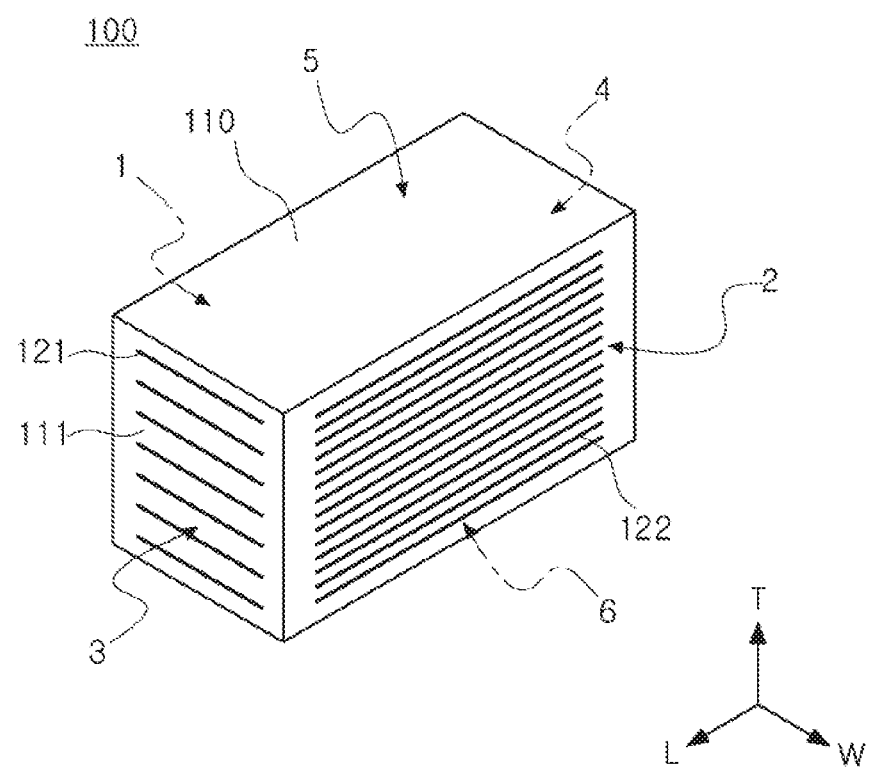
FIG. 2 is a perspective view of a ceramic body before first and second side margin portions are formed in FIG. 1.

FIG. 2 is a perspective view of a ceramic body before first and second side margin portions are formed in FIG. 1.

Figure 3:
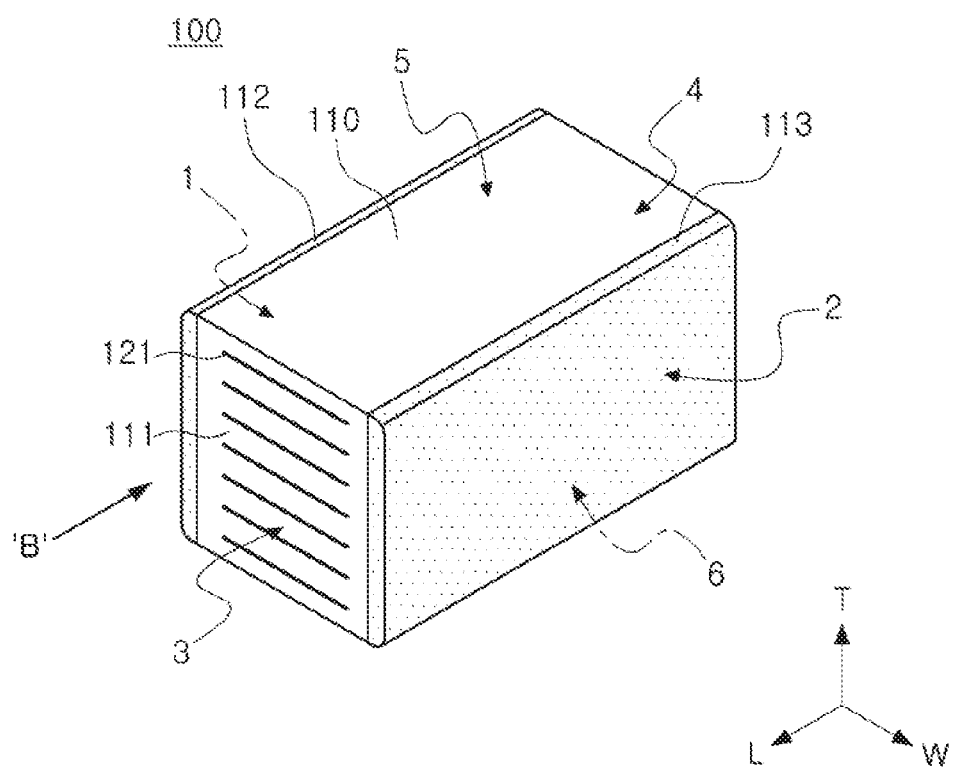
FIG. 3 is a perspective view of a ceramic body when the first and second side margin portions are formed in FIG. 2.

FIG. 3 is a perspective view of a ceramic body when the first and second side margin portions are formed in FIG. 2.

Referring to FIGS. 1 to 3, a multilayer ceramic capacitor 100 according to the present exemplary embodiment may include a ceramic body 110, a plurality of internal electrodes 121 and 122 formed inside the ceramic body 110, and external electrodes 131 and 132 formed on an external surface of the ceramic body 110.

The ceramic body 110 may have a first surface 1 and a second surface 2, which face each other, a third surface 3 and a fourth surface 4, which connect the first and second surfaces, and a fifth surface 5 and a sixth surface 6 which are upper and lower surfaces, respectively.

The first surface 1 and the second surface 2 may be defined as surfaces that face each other in a width direction of the ceramic body 110, the third surface 3 and the fourth surface 4 may be defined as surfaces that face each other in a length direction, and the fifth surface 5 and the sixth surface 6 may be defined as surfaces that face each other in a thickness direction.

A shape of the ceramic body 110 is not particularly limited but may be a rectangular parallelepiped shape as shown in the drawing.

One end portion of each of the plurality of internal electrodes 121 and 122 formed inside the ceramic body 110 may be exposed through the third surface 3 or the fourth surface 4 of the ceramic body.

The internal electrodes 121 and 122 may include a first internal electrode 121 and a second internal electrode 122 as a pair of electrodes with different polarities.

One end portion of the first internal electrode 121 may be exposed through the third surface 3 and one end portion of the second internal electrode 122 may be exposed through the fourth surface 4.

The other end portion of each of the first internal electrode 121 and the second internal electrode 122 may be spaced apart from the third surface 3 or the fourth surface 4 by a predetermined interval.

First and second external electrodes 131 and 132 may be formed on the third surface 3 and the fourth surface 4 of the ceramic body and may be electrically connected to the internal electrode.

According to an exemplary embodiment of the present disclosure, the multilayer ceramic capacitor 100 may include the plurality of internal electrodes 121 and 122 that are disposed inside the ceramic body 110, are exposed through the first and second surfaces 1 and 2, and have one end portion exposed through the third surface 3 or the fourth surface 4, and a first side margin portion 112 and a second side margin portion 113 that are disposed on one end portion of the plurality of internal electrodes 121 and 122 exposed through the first surface 1 and the second surface 2.

The plurality of internal electrodes 121 and 122 may be formed inside the ceramic body 110, each end of the plurality of internal electrodes 121 and 122 may be exposed through the first surface 1 and the second surface 2 that are surfaces in a width direction of the ceramic body 110, and the first side margin portion 112 and the second side margin portion 113 may be disposed on the exposed end portion.

An average thickness of the first side margin portion 112 and the second side margin portion 113 may be between 2 μm and 10 μm.

According to an exemplary embodiment of the present disclosure, the ceramic body 110 may include a stack structure in which a plurality of dielectric layers 111 is stacked, and the first side margin portion 112 and the second side margin portion 113 that are disposed on opposite lateral surfaces of the stack structure.

The plurality of dielectric layers 111 may be in a sintered state and may be integrated into each other in such a manner that a boundary between adjacent dielectric layers is not recognizable.

A length of the ceramic body 110 may correspond to a distance to the fourth surface 4 from the third surface 3 of the ceramic body.

A length of the dielectric layer 111 may form a distance between the third surface 3 and the fourth surface 4 of the ceramic body.

According to an exemplary embodiment of the present disclosure a length of the ceramic body may be, but is not limited to, within a range from 400 to 1400 μm. In more detail, the length of the ceramic body may be within a range from 400 to 800 μm or 600 to 1400 μm.

The internal electrodes 121 and 122 may be formed on the dielectric layer 111 and the internal electrodes 121 and 122 may be formed by being sintered inside the ceramic body across one dielectric layer.

Referring to FIG. 2, the first internal electrode 121 may be formed on the dielectric layer 111. The first internal electrode 121 may not be entirely formed in a length direction of a dielectric layer. That is, one end portion of the first internal electrode 121 may be spaced apart from the fourth surface 4 of the ceramic body by a predetermined interval, and the other end portion of the first internal electrode 121 may be formed up to the third surface 3 to be exposed through the third surface 3.

One end portion of the first internal electrode exposed through the third surface 3 of the ceramic body may be connected to the first external electrode 131.

Oppositely from the first internal electrode, one end portion of the second internal electrode 122 may be spaced apart from the third surface 3 by a predetermined interval and the other end of the second internal electrode 122 may be exposed through the fourth surface 4 to be connected to the second external electrode 132.

To embody a high-capacity multilayer ceramic capacitor, the internal electrode may be formed by stacking 400 or more layers but is not limited thereto.

The dielectric layer 111 may have the same width as a width of the first internal electrode 121. That is, the first internal electrode 121 may be entirely formed in a width direction of the dielectric layer 111.

According to an exemplary embodiment of the present disclosure, a width of a dielectric layer and a width of an internal electrode may be, but are not limited to, within a range from 100 to 900 μm. In more detail, the width of the dielectric layer and the width of the internal electrode may be within a range from 100 to 500 μm or 100 to 900 μm.

As a ceramic body is miniaturized, a thickness of aside margin portion may affect the electrical characteristics of a multilayer ceramic capacitor. According to an exemplary embodiment of the present disclosure, the thickness of the side margin portion may have a thickness of 10 μm or less to enhance the characteristics of a miniaturized multilayer ceramic capacitor.

That is, the side margin portion may be formed with a thickness equal to or less than 10 μm and, thus, an area in which internal electrodes overleap with each other to form capacity may be maximized, thereby embodying a high-capacity and miniaturized multilayer ceramic capacitor.

The ceramic body 110 may include an active portion A that facilitates formation of capacity of a capacitor, and upper and lower cover portions that are respectively formed on upper and lower portions of the active portion A as upper and lower margin portions.

The active portion A may be formed by repeatedly stacking the plurality of first and second internal electrodes 121 and 122 across the dielectric layer 111.

The upper and lower cover portions may have the same material and configuration as the dielectric layer 111 except that the upper and lower cover portions do not include an internal electrode.

That is, the upper and lower cover portions may include a ceramic material and, for example, may include a barium titanate ($BaTiO_3$)-based ceramic material.

The upper and lower cover portions may each have a thickness equal to or less than 20 μm but are not limited thereto.

According to an exemplary embodiment of the present disclosure, the internal electrode and the dielectric layer may be simultaneously cut and formed and the internal electrode may be formed with the same width as a width of the dielectric layer, which is described below in more detail.

According to the present exemplary embodiment, the dielectric layer may be formed with the same width as a width of the internal electrode and, thus, an end of the plurality of internal electrodes 121 and 122 may be exposed through first and second surfaces in a width direction of the ceramic body 110.

The first side margin portion 112 and the second side margin portion 113 may be formed on opposite lateral surfaces in the width direction of the ceramic body 110, through which the ends of the plurality of internal electrodes 121 and 122 are exposed.

The first side margin portion 112 and the second side margin portion 113 may each have a thickness equal to or less than 10 μm. As a thickness of each of the first side margin portion 112 and the second side margin portion 113 is reduced, an area by which internal electrodes formed in the ceramic body overlap with each other may be relatively increased.

The thickness of each of the first side margin portion 112 and the second side margin portion 113 is not particularly limited as long as short circuits of the internal electrode exposed through the lateral surface of the ceramic body 110 is prevented and, for example, the first side margin portion 112 and the second side margin portion 113 may have a thickness equal to or greater than 2 μm.

When the first and second side margin portions have a thickness less than 2 μm, there may be a worry about degraded mechanical strength with respect to external shocks and, when the first and second side margin portions have a thickness greater than 10 μm, an overlapping area of the plurality of internal electrodes may be reduced and it may be difficult to high capacity of a multilayer ceramic capacitor.

To maximize capacity of the multilayer ceramic capacitor, a method of thinning a dielectric layer, a method of stacking a multilayer thinned dielectric layer, a method of enhancing coverage of an internal electrode, or the like has been considered.

In addition, a method of enhancing an overlapping area of internal electrodes forming capacity has been considered.

To increase the overlapping area of the plurality of internal electrodes, a region of a margin portion, on which an internal electrode is not formed, needs to be minimized.

In particular, to increase the overlapping area of the plurality of internal electrodes as a multilayer ceramic capacitor is miniaturized, a region of the margin portion needs to be minimized.

According to the present exemplary embodiment, the internal electrode may be formed an entire width-direction area of the dielectric layer and a thickness of the side margin portion may be set to be equal to or less than 10 μm to increase the overlapping area of the internal electrode.

In general, as a dielectric layer is configured as a multilayer, a thickness of the dielectric layer and the internal electrode may be reduced. Accordingly, the internal electrode may be frequently short-circuited. When the internal electrode is formed only in a portion of the dielectric layer, a step different may be generated due to the internal electrode to reduce an accelerated lifetime or reliability.

However, according to the present exemplary embodiment, even if a thinned internal electrode and dielectric layer are formed, the internal electrode may be formed on an entire width-direction portion of the dielectric layer and, thus, the overlapping area of the internal electrode may be increased to increase capacity of the multilayer ceramic capacitor.

The step difference due to the internal electrode may be reduced to enhance an accelerated lifetime to provide a multilayer ceramic capacitor with excellent reliability as well as excellent capacity characteristics.

Figure 4:
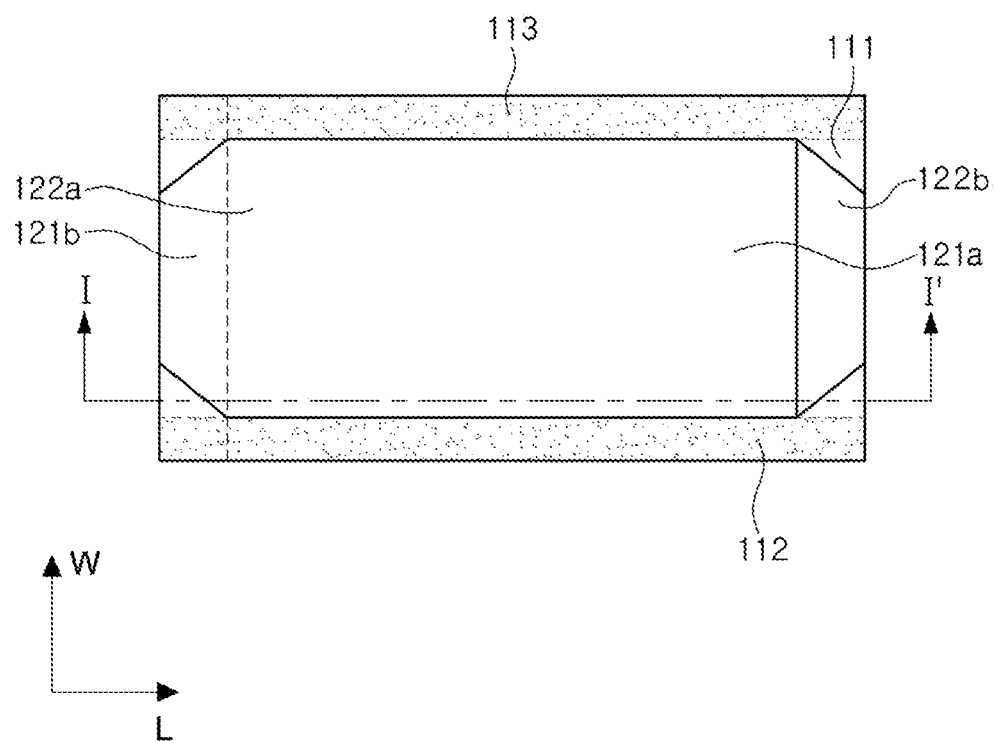
FIG. 4 is an upper plan view showing a shape of the plurality of internal electrodes of FIG. 2.

FIG. 4 is an upper plan view showing a shape of the plurality of internal electrodes of FIG. 2.

Figure 5:
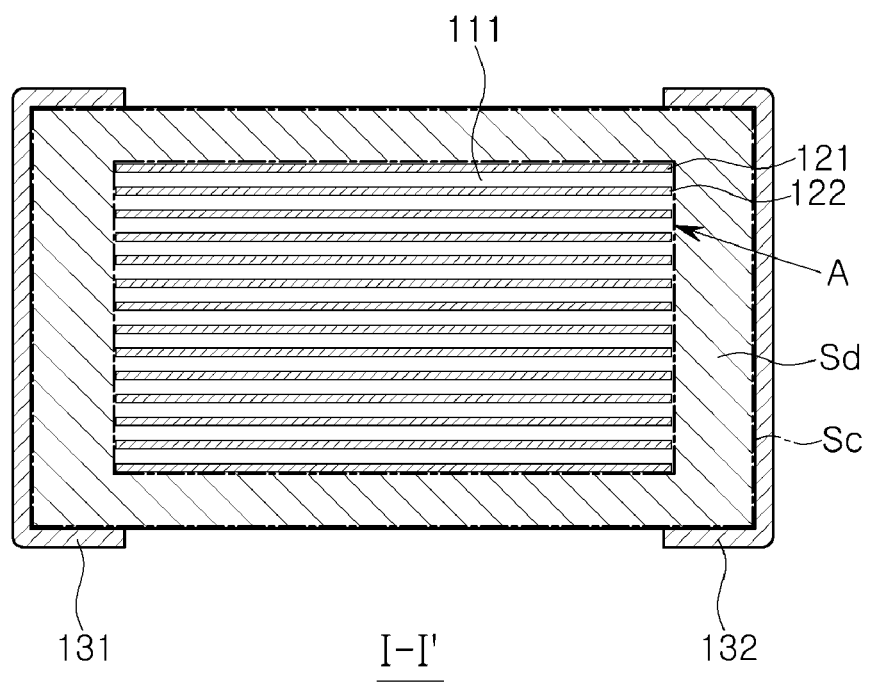
FIG. 5 is a cross-sectional view taken along a line I-I' of FIG. 1.

FIG. 5 is a cross-sectional view taken along a line I-I' of FIG. 1.

Referring to FIGS. 4 and 5, the plurality of internal electrodes 121 and 122 may include body portions 121a and 122a that facilitate formation of capacity, and lead portions 121b and 122b that have a smaller width than the body portions 121a and 122a and have an one end portion exposed through the third surface 3 or the fourth surface 4.

The body portions 121a and 122a of the plurality of internal electrodes may be exposed through the first surface 1 and the second surface 2 of the ceramic body 110.

The lead portions 121b and 122b of the plurality of internal electrodes may have a smaller width than the body portions 121a and 122a and may be spaced apart from the first surface 1 and the second surface 2 of the ceramic body 110.

The lead portions 121b and 122b of the plurality of internal electrodes are not particularly limited as long as the lead portions 121b and 122b have a smaller width than the body portions 121a and 122a and, for example, may have a quadrangular shape with a constant width or may be tapered in a direction in which the lead portions 121b and 122b are extended out of an external electrode.

According to an exemplary embodiment of the present disclosure, the first side margin portion 112 and the second side margin portion 113 may be disposed on the body portions 121a and 122a of the plurality of internal electrodes exposed through the first surface 1 and the second surface 2 and, in a section of the ceramic body 110 in a length-thickness (L-T) direction, a ratio Sd/Sc of an area Sd of a region except for the active portion A to an overall area Sc of the section may be greater than 27%.

In detail, in the section of the ceramic body 110 in the length-thickness (L-T) direction, the ratio Sd/Sc of the area Sd of the region except for the active portion A to the overall area Sc of the section may be equal to or greater than 29%.

The cross-section of the ceramic body 110 in the length-thickness (L-T) direction may correspond to a cross-section obtained in a region between width-direction opposite ends of the body portions 121a and 122a of the plurality of internal electrodes 121 and 122 and between a portion of width-direction opposite ends of the lead portions 121b and 122b.

That is, the section taken along a line I-I' of FIG. 5 may be defined as a section taken in the length-thickness (L-T) of the ceramic body 110 based on any one point of the region between width-direction opposite ends of the body portions 121a and 122a of the plurality of internal electrodes 121 and 122 and between width-direction opposite ends of the lead portions 121b and 122b.

In a conventional method of forming first and second side margin portions, a lateral-surface ceramic sheet may be adhered to a lateral surface of a ceramic body, through which an end of a first internal electrode pattern and a second internal electrode pattern is exposed and heat and pressure may be applied to form the first and second side margin portions.

In this case, when adhesive force between the side margin portion and the ceramic body is degraded, there is a problem in that the lateral-surface ceramic sheet delaminates to cause outer appearance failure, may also degrade insulation resistance characteristics, and may cause waterproof reliability failure.

To overcome the above problem, conventionally, high heat and pressure are applied to form the side margin portion to strengthen adhesive force between the side margin portion and the ceramic body.

However, as such, when high heat and pressure are applied, there is a problem in that a thin internal electrode and dielectric layer are damaged to degrade electrical characteristics such as short circuits.

That is, the dielectric layer and the internal electrode needs to be thinned in a miniaturized and high-capacity multilayer ceramic capacitor and, thus, the conventional method of applying high heat and pressure to form the side margin portion may cause a problem.

According to an exemplary embodiment of the present disclosure, in consideration of the fact that the side margin portion including a ceramic material has higher adhesive force with a similar ceramic material to the side margin portion than adhesive force with the internal electrode including conductive material, a method of enhancing a dielectric area ratio to a contact area between the side margin portion and the ceramic body may be used.

That is, the plurality of internal electrodes 121 and 122 may be changed in a shape to include the body portions 121a and 122a that facilitate formation of capacity, and lead portions 121b and 122b that have a smaller width than the body portions 121a and 122a to minimize a region of the internal electrode, which is exposed through the first surface 1 and the second surface 2 of the ceramic body 110 and to enhance a dielectric area ratio of the ceramic body 110 including a similar ceramic material to the side margin portion.

Accordingly, adhesive force of an interface between the ceramic body and the side margin portion may be enhanced to reduce outer appearance failure.

The adhesive force of the interface between the ceramic body and the side margin portion may be enhanced to enhance insulation resistance characteristics and to enhance waterproof reliability failure.

In particular, according to an exemplary embodiment of the present disclosure, in a section of the ceramic body 110 in a length-thickness (L-T) direction, a ratio Sd/Sc of an area Sd of a dielectric region except for the active portion A to an overall area Sc of the section may be greater than 27%, thereby enhancing the adhesive force of the interface between the ceramic body and the side margin portion.

In the section of the ceramic body 110 in the length-thickness (L-T) direction, the ratio Sd/Sc of the area Sd of the dielectric region except for the active portion A to the overall area Sc of the section may be greater than 27%, thereby minimizing a region of the internal electrode, which is exposed through the first surface 1 and the second surface 2 of the ceramic body 110, and enhancing a dielectric area ratio.

In the section of the ceramic body 110 in the length-thickness (L-T) direction, when the ratio Sd/Sc of the area Sd of the dielectric region except for the active portion A to the overall area Sc of the section is equal to or less than 27%, adhesive force between the side margin portion and the ceramic body may be degraded similarly to a conventional multilayer ceramic capacitor and, thus, there is a problem in that the lateral-surface ceramic sheet delaminates to cause outer appearance failure, may also degrade insulation resistance characteristics, and may cause waterproof reliability failure.

In detail, in the section of the ceramic body 110 in the length-thickness (L-T) direction, the ratio Sd/Sc of the area Sd of the dielectric region except for the active portion A to the overall area Sc of the section may be equal to or greater than 29%.

In this case, the region of the internal electrode, which is exposed through the first surface 1 and the second surface 2 of the ceramic body 110, may be minimized and the dielectric area ratio may be further enhanced and, thus, adhesive force between the interface between the ceramic body and the side margin portion may be further enhanced.

According to the present disclosure, although an upper limit of the ratio Sd/Sc of the area Sd of the region except for the active portion A to the overall area Sc of the section is not particularly limited, when the value of Sd/Sc is increased, capacity of a multilayer ceramic capacitor may be reduced due to reduction in an area of the body portions 121a and 122a that facilitate formation of capacity of the plurality of internal electrodes 121 and 122 and, thus, the upper limit of the value of Sd/Sc may be determined according to a desired capacity value.

According to an exemplary embodiment of the present disclosure, a miniaturized and high-capacity multilayer ceramic capacitor may be configured in such a manner that the dielectric layer 111 has a thickness equal to or less than 0.4 µm and the internal electrodes 121 and 122 have a thickness equal to or less than 0.4 µm.

Like in an exemplary embodiment of the present disclosure, when a thin dielectric layer and internal electrode configured in such a manner that the dielectric layer 111 has a thickness equal to or less than 0.4 µm and the internal electrodes 121 and 122 have a thickness equal to or less than 0.4 µm is applied, if high heat and pressure are applied to the side margin portion to enhance adhesive force of an interface between the ceramic body and the side margin portion like in the prior art, the dielectric layer and the internal electrode may be damaged to degrade electrical characteristics.

However, according to an exemplary embodiment of the present disclosure, the plurality of internal electrodes 121 and 122 may be changed in a shape to include the body portions 121a and 122a that facilitate formation of capacity, and lead portions 121b and 122b that have a smaller width than the body portions 121a and 122a to minimize a region of the internal electrode, which is exposed through the first surface 1 and the second surface 2 of the ceramic body 110 and to enhance a dielectric area ratio of the ceramic body 110 including a similar ceramic material to the side margin portion and, thus, in the case of a thin film in that the dielectric layer 111 and the first and second internal electrodes 121 and 122 have a thickness equal to or less than 0.4 µm, adhesive force of the interface between the ceramic body and the side margin portion may be enhance, thereby enhancing reliability.

That is, unlike in the prior art, although high heat and pressure are not applied to form the side margin portion to enhance adhesive force of the interface between the ceramic body and the side margin portion, a dielectric area ratio of the ceramic body, contacting the side margin portion, is high and, thus, adhesive force may be enhanced to obtain sufficient adhesive force of an interface simply using low heat and pressure, thereby minimizing damage applied to a thin dielectric layer and internal electrode to enhance reliability.

However, the thin film may not refer to the case in which the dielectric layer 111 and the first and second internal electrodes 121 and 122 have a thickness equal to or less than 0.4 µm and may be interpreted as a concept including a dielectric layer and internal electrode with a smaller thickness than a conventional product.

Figure 6:
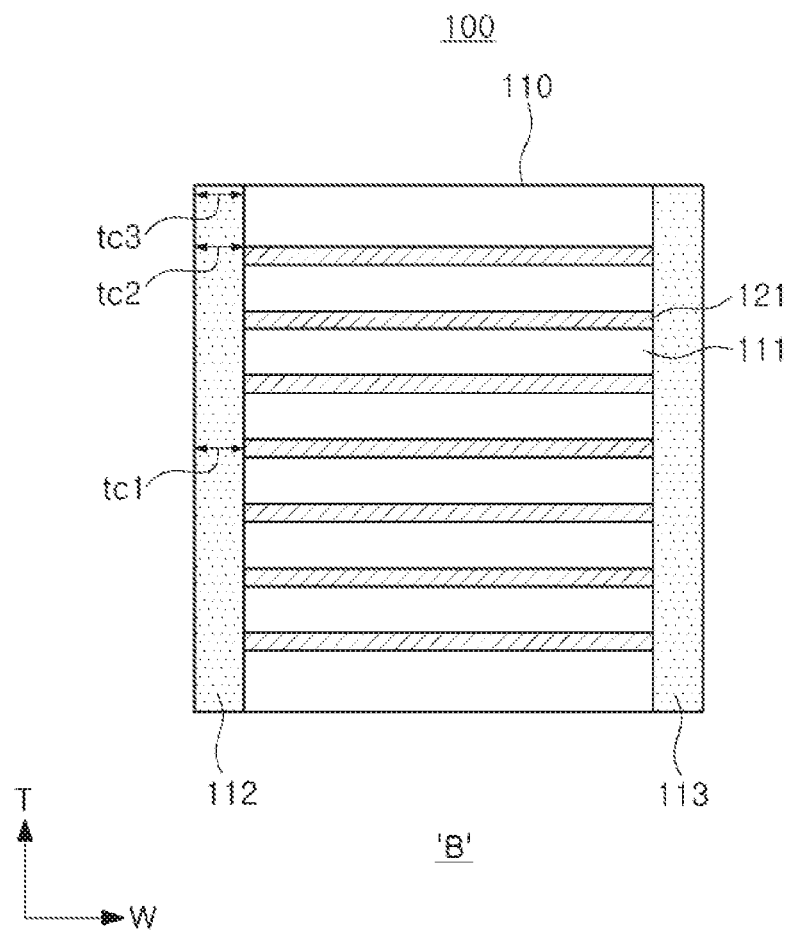
FIG. 6 is a cross-sectional view viewed in a direction B of FIG. 3.

FIG. 6 is a cross-sectional view in a width-thickness direction of FIG. 3, viewed in a direction B.

Referring to FIG. 6, a ratio of a thickness tc2 of a region of the first or second side margin portion, contacting edges of the plurality of internal electrodes disposed as the outermost portion, to a thickness tc1 of a region of the first or second side margin portion, contacting edges of the plurality of internal electrodes disposed in a central portion of the plurality of internal electrodes 121 and 122, may be equal to or less than 1.0.

A lower limit of the ratio of the thickness tc2 of a region of the first or second side margin portion, contacting edges of the plurality of internal electrodes disposed as the outermost portion, to the thickness tc1 of a region of the first or second side margin portion, contacting edges of the plurality of internal electrodes disposed in a central portion, is not particularly limited but may be equal to or greater than 0.9.

According to an exemplary embodiment of the present disclosure, unlike the prior art, the first or second side margin portion is formed by attaching a ceramic green sheet to a lateral surface of a ceramic body and, thus, a thickness in each position of the first or second side margin portion may be constant.

That is, a conventionally, a side margin portion is formed by coating or printing ceramic slurry and, thus, a deviation in the side margin portion for each position is serious.

In detail, conventionally, a thickness of a region of the first or second margin portion, contacting edges of the plurality of internal electrodes disposed in a central portion of a ceramic body, may be greater than a thickness of the other region.

For example, conventionally, a ratio of a thickness of a region of the first or second margin portion, contacting edges of the plurality of internal electrodes disposed as the outermost portion, to the thickness of a region of the first or second margin portion, contacting edges of the plurality of internal electrodes disposed in the central portion may be less than 0.9 and, thus, a deviation between the thicknesses is high.

As such, in the conventional case in which a deviation in a thickness of a side margin portion for each position is high, a multilayer ceramic capacitor with a constant size has a large portion occupied by the side margin portion and, thus, it is not possible to ensure a large size of a capacity formation portion and it is difficult to ensure high capacity.

On the other hand, according to an exemplary embodiment of the present disclosure, an average thickness of the first and second side margin portions 112 and 113 is between 2 µm and 10 µm and a ratio of the thickness tc2 of the region of the first or second side margin portion, contacting edges of the plurality of internal electrodes disposed as the outermost portion, to a thickness tc1 of a region of the first or second side margin portion, contacting edges of the plurality of internal electrodes disposed in a central portion of the plurality of internal electrodes 121 and 122, is between 0.9 and 1.0 and, thus, the side margin portion may have a small thickness and a low thickness deviation to ensure a large size of a capacity formation portion.

According to an exemplary embodiment of the present disclosure, a ceramic green sheet may be attached to a lateral surface of a ceramic body and, thus, a thickness of the first or second side margin portion for each position may be constant, differently from the conventional case.

Accordingly, it may be possible to embody a high-capacity multilayer ceramic capacitor.

Referring to FIG. 6, a ratio of a thickness tc3 of a region of the first or second side margin portion, contacting an edge of the ceramic body 110, to the thickness tc1 of a region of the first or second side margin portion, contacting edges of the plurality of internal electrodes disposed in a central portion of the plurality of internal electrodes 121 and 122, may be equal to or less than 1.0.

A lower limit of the ratio of thickness tc3 of a region of the first or second side margin portion, contacting the edge of the ceramic body 110, to the thickness tc1 of a region of the first or second side margin portion, contacting edges of the plurality of internal electrodes disposed in a central portion, may be equal to or greater than 0.9.

According to the above characteristics, a large size of a capacity formation portion may be ensured due to a small thickness deviation of the side margin portion for each region and, thus, it may be possible to embody a high-capacity multilayer ceramic capacitor.

FIGS. 7A to 7F are schematic cross-sectional views of a method of manufacturing a multilayer ceramic capacitor according to another exemplary embodiment of the present disclosure.

Another exemplary embodiment of the present disclosure may provide a method of manufacturing a multilayer ceramic capacitor, including preparing a first ceramic green sheet on which a plurality of first internal electrode patterns are formed at a predetermined interval and a second ceramic green sheet on which a plurality of second internal electrode patterns are formed at a predetermined interval, forming a ceramic green sheet stack body by stacking the first and second ceramic green sheets in such a manner that the first and second internal electrode patterns intersect each other, cutting the ceramic green sheet stack body to have a lateral surface through which an end of the first and second internal electrode patterns is exposed in a width direction, forming a first side margin portion and a second side margin portion on the lateral surface through which the end of the first and second internal electrode patterns is exposed, and preparing a ceramic body including an active portion that includes a dielectric layer and a plurality of internal electrodes disposed to face each other across the dielectric layer to form capacity and forms capacity, and cover portions formed above and below the active portion by sintering the cut stack body, and including first and second surfaces opposing each other, third and fourth surfaces connecting the first and second surfaces, and fifth and sixth surfaces connected to the first to fourth surfaces and opposing each other and, in this case, the plurality of internal electrodes may include body portions that facilitate formation of capacity, and lead portions that have a smaller width than the body portions and have an one end portion exposed through the third or fourth surface, the body portion of the plurality of internal electrodes may be exposed through the first and second surfaces of the ceramic body and the first and second side margin portions may be disposed on the body portion exposed through the first and second surfaces, and, in a section of the ceramic body in a length-thickness (L-T) direction, a ratio Sd/Sc of an area Sd of a dielectric region except for the active portion to an overall area Sc of the section is greater than 27%.

Hereinafter, a method of manufacturing a multilayer ceramic capacitor according to another exemplary embodiment of the present disclosure is described.

Figure 7A:
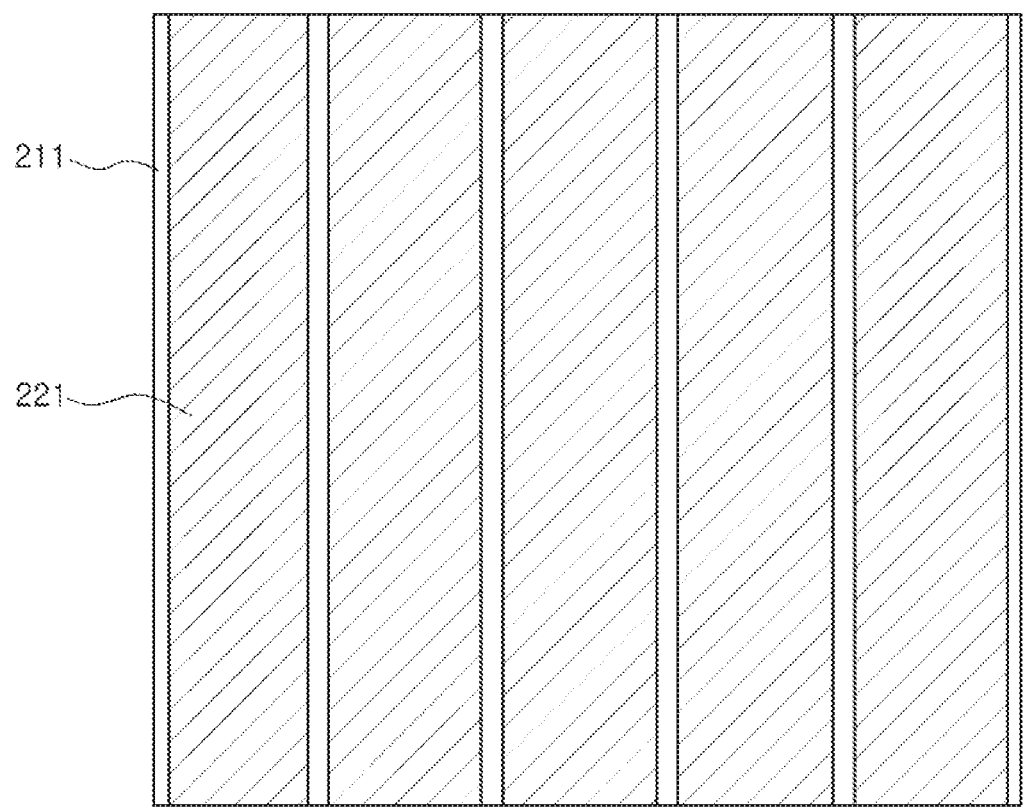

Referring to FIG. 7A, a plurality of stripe-type first internal electrode patterns 221 may be formed on a ceramic green sheet 211 at a predetermined interval. The plurality of stripe-type first internal electrode patterns 221 may be formed in parallel to each other.

The ceramic green sheet 211 may be formed of a ceramic paste including a ceramic powder, an organic solvent, and an organic binder.

The ceramic powder may be a material with a high dielectric constant but may be, but is not limited to, a barium titanate ($BaTiO_3$)-based material, a lead perovskite-based material, a strontium titanate ($SrTiO_3$)-based material, or the like and, for example, maybe a barium titanate ($BaTiO_3$) powder. The ceramic green sheet 211 is sintered to form the dielectric layer 111 configuring the ceramic body 110.

The stripe-type first internal electrode pattern 221 may be formed of an internal paste including conductive metal. The conductive metal may be, but is not limited to, nickel (Ni), copper (Cu), palladium (Pd), or an alloy thereof.

A method of forming the stripe-type first internal electrode pattern 221 on the ceramic green sheet 211 may not be particularly limited but, for example, may be a printing method such as a screen printing method or a gravia printing method.

Although not illustrated, a plurality of stripe-type second internal electrode patterns 222 may be formed on another ceramic green sheet 211 at a predetermined interval.

Hereinafter, a ceramic green sheet on which the first internal electrode pattern 221 is formed may be referred to as a first ceramic green sheet and a ceramic green sheet on which the second internal electrode pattern 222 may be referred to as a second ceramic green sheet.

Figure 7B:
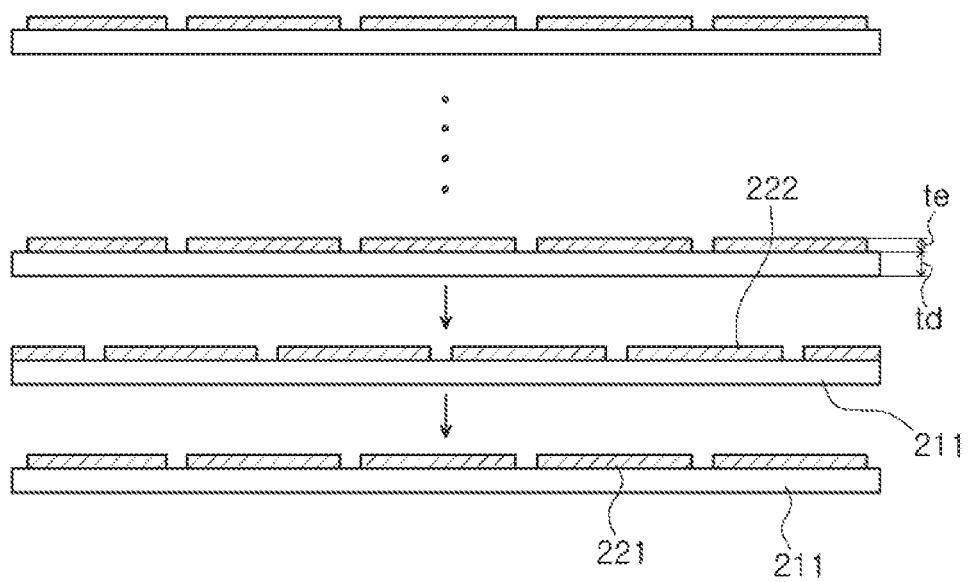

Then, as shown in FIG. 7B, first and second ceramic green sheets may be alternately stacked in such a manner that the stripe-type first internal electrode pattern 221 and the stripe-type second internal electrode pattern 222 are stacked to intersect each other.

Then, the stripe-type first internal electrode pattern 221 may become the first internal electrode 121 and the stripe-type second internal electrode pattern 222 may be the second internal electrode 122.

The first internal electrode pattern 221 and the second internal electrode pattern 222 may be formed to include body portions that facilitate formation of capacity and lead portions having a smaller width than the body portions like in an exemplary embodiment of the present disclosure shown in FIG. 6.

According to another exemplary embodiment of the present disclosure, the first and second ceramic green sheets may have a thickness td equal to or less than 0.6 μm and the first and second internal electrode patterns may have a thickness te equal to or less than 0.5 μm.

The present disclosure relates to a miniaturized and high-capacity multilayer ceramic capacitor including a thin film that includes a dielectric layer with a thickness equal to or less than 0.4 μm and an internal electrode with a thickness equal to or less than 0.4 μm and, thus, the first and second ceramic green sheets may have a thickness td equal to or less than 0.6 μm and the first and second internal electrode patterns may have a thickness te equal to or less than 0.5 μm.

Figure 7C:
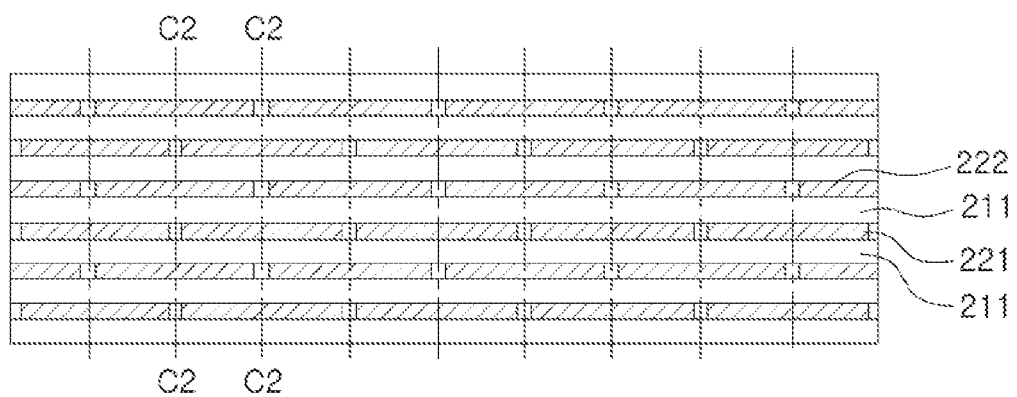

FIG. 7C is a cross-sectional view of a ceramic green sheet stack body 220 in which first and second ceramic green sheets are stacked according to an exemplary embodiment of the present disclosure. FIG. 7D is a perspective view of the ceramic green sheet stack body 220 in which first and second ceramic green sheets are stacked.

Referring to FIGS. 7C and 7D, the first ceramic green sheet on which the plurality of stripe-type first internal electrode patterns 221 formed in parallel to each other are printed and the second ceramic green sheet on which the plurality of stripe-type second internal electrode pattern 222 formed in parallel to each other are printed may be alternately stacked.

In more detail, the first and second ceramic green sheets may be stacked in such a manner that intervals between central portions of the stripe-type first internal electrode patterns 221 printed on the first ceramic green sheet and the stripe-type second internal electrode patterns 222 printed on the second ceramic green sheet overlap with each other.

Then, referring to FIG. 7D, the ceramic green sheet stack body 220 may be cut to intersect the plurality of stripe-type first internal electrode patterns 221 and the plurality of stripe-type second internal electrode patterns 222. That is, the ceramic green sheet stack body 220 may become stack bodies 210 formed by cutting the ceramic green sheet stack body 220 along cutting lines C1-C1 and C2-C2 that are perpendicular to each other.

In more detail, the stripe-type first internal electrode pattern 221 and the stripe-type second internal electrode pattern 222 may be cut in a length direction to be divided into a plurality of internal electrodes with a constant width. In this case, the stacked ceramic green sheets may also be cut along with the internal electrode patterns. Accordingly, the dielectric layer may be formed with the same width as a width of the internal electrode.

The ceramic green sheet stack body 220 may be cut along the cutting line C2-C2 depending on a size of a separate ceramic body. That is, the plurality of stack bodies 210 may be formed by cutting a bar-type stack structure along the cutting line C2-C2 with a ceramic body size before the first side margin portion and the second side margin portion are formed.

That is, the bar-type stack structure may be cut to cut overlapping predetermined intervals formed between the central portions of the first internal electrodes and the second internal electrode along the same cutting line. Accordingly, one end portions of the first internal electrode and the second internal electrode may be alternately exposed through the cut surface.

Then, the first side margin portion and the second side margin portion may be formed on the first and second lateral surfaces of the stack bodies 210.

Figure 7E:
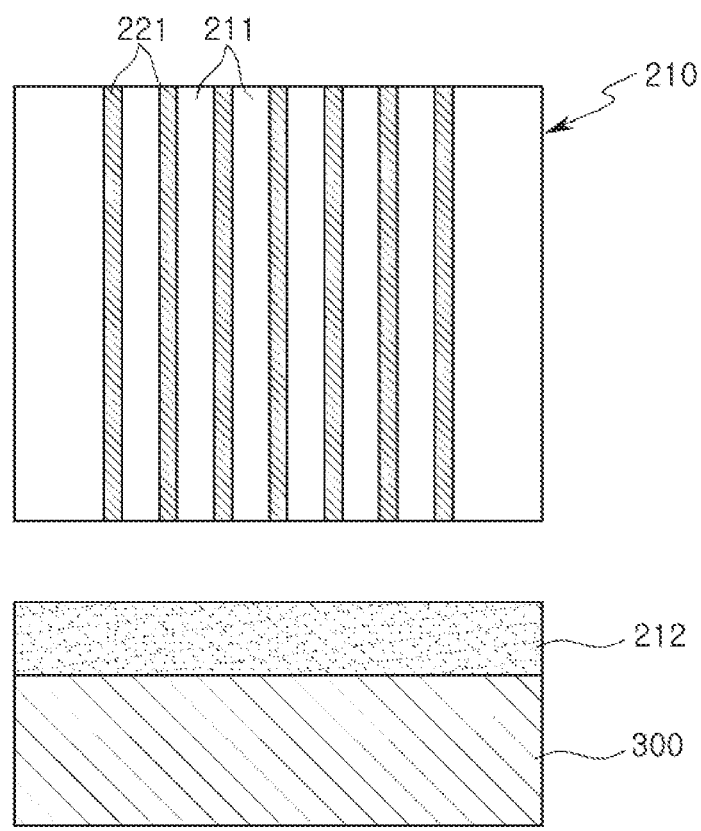

Then, as shown in FIG. 7E, first side margin portion 212 and second side margin portion (not shown) may be formed on the first and second lateral surface of the stack body 210, respectively.

In detail, the first side margin portion 212 may be formed using a method of disposing a lateral-surface ceramic green sheet 212 on a punching elastic member 300 formed of rubber.

Then, the stack body 210 may be rotated at an angle of 90 degrees in such a manner that a first lateral surface of the stack body 210 faces the lateral-surface ceramic green sheet 212 and, then, the stack body 210 may be pressed-adhered to the lateral-surface ceramic green sheet 212.

When the stack body 210 is pressed and adhered to the lateral-surface ceramic green sheet 212 to transfer the lateral-surface ceramic green sheet 212 to the stack body 210, the lateral-surface ceramic green sheet 212 may be formed to an edge of a lateral surface of the stack body 210 and the remaining portion maybe cut due to the punching elastic member 300 formed of a rubber material.

Figure 7F:
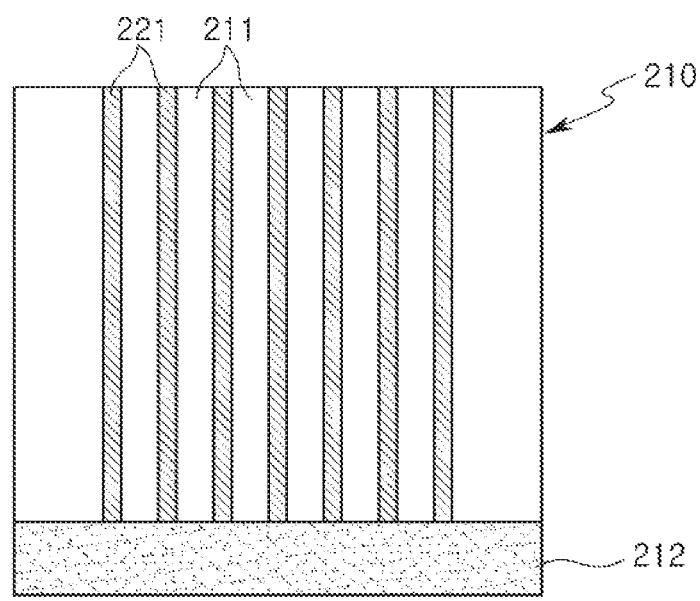

FIG. 7F illustrates the case in which the lateral-surface ceramic green sheet 212 is formed to the edge of the lateral surface of the stack body 210.

Then, the stack body 210 may be rotated and, thus, the second side margin portion may be formed on a second lateral surface of the stack body 210.

Then, a stack body with first and second side margin portions being formed on opposite lateral surfaces of the stack body 210 may be plasticized and sintered to form a ceramic body including a dielectric layer and first and second internal electrodes.

According to an exemplary embodiment of the present disclosure, the plurality of internal electrodes 121 and 122 may be changed in a shape to include the body portions 121$a$ and 122$a$ that facilitate formation of capacity, and lead portions 121$b$ and 122$b$ that have a smaller width than the body portions 121$a$ and 122$a$ to minimize a region of the internal electrode which is exposed through the ceramic body 110 in a width direction, and to enhance a dielectric area ratio and, thus, unlike in the prior art, the lateral-surface ceramic green sheet 212 may be transferred to a lateral surface of the stack body 210 at low temperature and low pressure condition.

Accordingly, damage generated in the stack body 210 may be minimized and, thus, the electrical characteristics of a multilayer ceramic capacitor may be prevented from being degraded after being sintered, thereby enhancing reliability.

In addition, the region of the internal electrode, which is exposed through the ceramic body 110 in the width direction, may be minimized and the dielectric area ratio may be enhanced and, thus, adhesive force between the stack body and the lateral-surface ceramic green sheet may be enhanced.

Then, external electrodes may be respectively formed on a third lateral surface of the ceramic body, through which the first internal electrode is exposed, and a fourth lateral surface of the ceramic body, through which the second internal electrode is exposed.

According to another exemplary embodiment of the present disclosure, a lateral-surface ceramic green sheet is thin and has a small thickness deviation to ensure a large capacity formation portion.

In detail, an average thickness of the first and second side margin portions 112 and 113 may be between 2 μm and 10 μm after the first and second side margin portions 112 and 113 are sintered and a large size of the capacity formation portion may be ensured due to a small thickness deviation for each position.

Accordingly, it may be possible to embody a high-capacity multilayer ceramic capacitor.

In addition, a description of the same parts as in the aforementioned exemplary embodiment of the present disclosure is omitted here to avoid repetition of the description.

Although the present disclosure is described below in detail through Experimental Example, this is for aiding in understanding of the present disclosure and the scope of the present disclosure is not limited by Experimental Example.

Experimental Example

According to an exemplary embodiment of the present disclosure, Comparative Example is prepared in such a manner that a side margin portion is formed using a lateral-surface ceramic green sheet on a lateral surface of a ceramic body in which an entire portion of an internal electrode is exposed through a width-direction lateral surface like in the prior art and Inventive Example is prepared in such a manner that a side margin portion is formed using a lateral-surface ceramic green sheet on a lateral surface of a ceramic body with an enhanced dielectric area ratio by minimizing exposure of the internal electrode as much as a lead portion.

In addition, a ceramic green sheet stack body is formed in such a manner a side margin portion is formed by attaching a lateral-surface ceramic green sheet to an exposed portion of an electrode of a green chip without margin because an internal electrode is exposed in a width direction.

Predetermined temperature and pressure are applied under a condition with minimized modification of a chip and lateral-surface ceramic green sheets are attached to opposite surfaces of a ceramic green sheet stack body to manufacture multilayer ceramic capacitor green chip with 0603 size (width×length×height: 0.6 mm×0.3 mm×0.3 mm).

The completely manufactured multilayer ceramic capacitor test piece is plasticized at 400° C. or less and nitrogen atmosphere, is sintered at sintering temperature of 1200° C. or less and a condition of hydrogen ion concentration of $H_2$ of 0.5% or less, is installed on a printed circuit board and, then, the electrical characteristics such as waterproof characteristics are synthetically checked.

Like in the prior art, in the case of Comparative Example prepared in such a manner that the side margin portion is formed using the lateral-surface ceramic green sheet on the lateral surface of the ceramic body in which the entire portion of the internal electrode is exposed through the width-direction lateral surface, outer appearance failure in that the side margin portion delaminates from the body during formation of the side margin portion occurs and, thus, there is a problem in terms of degraded insulation resistance and degraded waterproof characteristics.

However, when high heat and pressure are applied to form a side margin portion to prevent delamination failure, a thin dielectric layer and internal electrode may be damaged, thereby degrading electrical characteristics.

However, in the case of an exemplary embodiment in which exposure of the internal electrode is minimized by as much as a region of the lead portion and a side margin portion is formed using a lateral-surface ceramic green sheet on a lateral surface of a ceramic body with an increased dielectric area ratio, even if low temperature and pressure are applied, adhesive force between the ceramic body and the side margin portion may be excellent, there is no delamination failure, insulation resistance characteristics are excellent, and waterproof reliability is enhanced.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
 a ceramic body including an active portion including dielectric layers and a plurality of internal electrodes overlapping each other across the dielectric layers, and upper and lower cover portions formed above and below the active portion, respectively, and including first and second surfaces opposing each other, third and fourth surfaces connecting the first and second surfaces, and fifth and sixth surfaces connected to the first to fourth surfaces and opposing each other; and
 first and second side margin portions disposed on the first and second surfaces,
 wherein the plurality of internal electrodes include body portions, and lead portions that have a smaller width than the body portions and have an end portion exposed through the third or fourth surface;
 wherein surfaces of the body portions are exposed through the first and second surfaces of the ceramic body and the first and second side margin portions are disposed on the surfaces of the body portions exposed through the first and second surfaces;
 wherein each of the upper and lower cover portions has a thickness equal to or less than 20 μm;
 wherein, in a cross-section of the ceramic body in a length-thickness (L-T) direction, a ratio Sd/Sc of an area Sd of a region except for the active portion to an overall area Sc of the cross-section is greater than 27%,
 wherein each of the dielectric layers has a thickness equal to or less than 0.4 μm and each of the plurality of internal electrodes has a thickness equal to or less than 0.4 μm, and
 wherein a number of the plurality of internal electrodes is 400 or more.

2. The multilayer ceramic capacitor of claim 1, wherein, in the cross-section of the ceramic body in the length-thickness (L-T) direction, the ratio Sd/Sc of the area Sd of the region except for the active portion to the overall area Sc of the cross-section is equal to or greater than 29%.

3. The multilayer ceramic capacitor of claim 1, wherein the exposed surfaces of the lead portions are spaced apart from the first and second surfaces of the ceramic body.

4. The multilayer ceramic capacitor of claim 1, wherein a ratio of a thickness of a region of the first or second side margin portion, contacting edges of the plurality of internal electrodes disposed as an outermost portion, to a thickness of a region of the first or second side margin portion, contacting edges of the plurality of internal electrodes disposed in a central portion among the plurality of internal electrodes, is within a range from 0.9 and 1.0.

5. The multilayer ceramic capacitor of claim 1, wherein a ratio of a thickness of a region of the first or second side margin portion, contacting an edge of the ceramic body, to a thickness of a region of the first or second side margin portion, contacting edges of the plurality of internal electrodes disposed in a central portion among the plurality of internal electrodes, is within a range from 0.9 and 1.0.

6. The multilayer ceramic capacitor of claim 1, wherein the first and second side margin portions have an average thickness within a range from 2 μm and 10 μm.

7. The multilayer ceramic capacitor of claim 1, wherein the cross-section of the ceramic body in the length-thickness (L-T) direction is in a region between width-direction opposite ends of the body portions of the plurality of internal electrodes and between width-direction opposite ends of the lead portions.

8. A method of manufacturing a multilayer ceramic capacitor, the method comprising:
 preparing a first ceramic green sheet on which a plurality of first internal electrode patterns are formed and a second ceramic green sheet on which a plurality of second internal electrode patterns are formed;
 forming a ceramic green sheet stack body by stacking the first and second ceramic green sheets such that the first and second internal electrode patterns partially overlap each other;
 cutting the ceramic green sheet stack body to have a lateral surface through which ends of the first and second internal electrode patterns are exposed in a width direction;
 forming first and second side margin portions on the lateral surface through which the ends of the first and second internal electrode patterns are exposed; and preparing a ceramic body including an active portion that includes dielectric layers and a plurality of internal electrodes overlapping each other across the dielectric layers, and upper and lower cover portions respectively formed above and below the active portion by sintering the cut ceramic green sheet stack body, and including first and second surfaces opposing each other, third and fourth surfaces connecting the first and second surfaces, and fifth and sixth surfaces connected to the first to fourth surfaces and opposing each other, wherein the plurality of internal electrodes include body portions, and lead portions having a smaller width than the body portions and having one end portion exposed through the third or fourth surface;

wherein the body portions of the plurality of internal electrodes are exposed through the first and second surfaces of the ceramic body and the first and second side margin portions are disposed on the body portions exposed through the first and second surfaces;

wherein each of the upper and lower cover portions has a thickness equal to or less than 20 μm, wherein, in a cross-section of the ceramic body in a length-thickness (L-T) direction, a ratio Sd/Sc of an area Sd of a region except for the active portion to an overall area Sc of the cross-section is greater than 27%, wherein each of the dielectric layers has a thickness equal to or less than 0.4 μm and each of the plurality of internal electrodes has a thickness equal to or less than 0.4 μm, and wherein a number of the plurality of internal electrodes is 400 or more.

9. The method of claim 8, wherein, in the cross-section of the ceramic body in the length-thickness (L-T) direction, the ratio Sd/Sc of the area Sd of the region except for the active portion to the overall area Sc of the cross-section is equal to or greater than 29%.

10. The method of claim 8, wherein the lead portions of the plurality of internal electrodes are spaced apart from the first and second surfaces of the ceramic body.

11. The method of claim 8, wherein the first and second ceramic green sheets have a thickness equal to or less than 0.6 μm and first and second internal electrode patterns have a thickness equal to or less than 0.5 μm.

12. The method of claim 8, wherein a ratio of a thickness of a region of the first or second side margin portion, contacting edges of the plurality of internal electrodes disposed as an outermost portion, to a thickness of a region of the first or second side margin portion, contacting edges of the plurality of internal electrodes disposed in a central portion of the plurality of internal electrodes, is within a range from 0.9 and 1.0.

13. The method of claim 8, wherein a ratio of a thickness of a region of the first or second side margin portion, contacting an edge of the ceramic green sheet stack body, to a thickness of a region of the first or second side margin portion, contacting edges of the plurality of internal electrodes disposed in a central portion of the plurality of internal electrodes, is within a range from 0.9 and 1.0.

14. The method of claim 8, wherein the first and second side margin portions have an average thickness within a range from 2 μm and 10 μm.

15. The method of claim 8, wherein the cross-section of the ceramic body in the length-thickness (L-T) direction is a cross-section obtained in a region between width-direction opposite ends of the body portions of the plurality of internal electrodes and between width-direction opposite ends of the lead portions.

* * * * *